US012116315B2

United States Patent
Li et al.

(10) Patent No.: US 12,116,315 B2
(45) Date of Patent: Oct. 15, 2024

(54) KARST CHANNEL TYPE WATER INRUSH EFFICIENT-BLOCKING ULTRA-HIGH EXPANSION GROUTING MATERIAL AND PREPARATION AND USING METHODS AND APPLICATION THEREOF

(71) Applicant: SHANDONG UNIVERSITY, Shandong (CN)

(72) Inventors: Shucai Li, Jinan (CN); Rentai Liu, Jinan (CN); Chenyang Ma, Jinan (CN); Mengjun Chen, Jinan (CN); Jiwen Bai, Jinan (CN); Zhenjun Wang, Jinan (CN); Huasheng Zhang, Jinan (CN); Shaolong Duan, Jinan (CN); Jiawei Tian, Shandong (CN); Mi Zhang, Jinan (CN); Chunyu Zhang, Jinan (CN); Xiuhao Li, Jinan (CN); Xiangchao Sheng, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 712 days.

(21) Appl. No.: 17/299,031

(22) PCT Filed: Nov. 3, 2020

(86) PCT No.: PCT/CN2020/126274
§ 371 (c)(1),
(2) Date: Jun. 2, 2021

(87) PCT Pub. No.: WO2021/098505
PCT Pub. Date: May 27, 2021

(65) Prior Publication Data
US 2022/0048821 A1    Feb. 17, 2022

(30) Foreign Application Priority Data

Nov. 18, 2019   (CN) .......................... 201911128522.9

(51) Int. Cl.
*C08J 3/12*     (2006.01)
*C04B 26/06*    (2006.01)
(Continued)

(52) U.S. Cl.
CPC ............ *C04B 26/06* (2013.01); *C08F 220/06* (2013.01); *C08J 3/126* (2013.01); *C08J 3/16* (2013.01);
(Continued)

(58) Field of Classification Search
CPC ............ C04B 26/06; C04B 2013/0049; C04B 2111/00663; C04B 2111/00698;
(Continued)

(56) References Cited

U.S. PATENT DOCUMENTS 5,663,267 A    9/1997    Frost

FOREIGN PATENT DOCUMENTS

CN    101392045 A    3/2009
CN    102408866 A    4/2012
(Continued)

OTHER PUBLICATIONS

Jan. 11, 2021 Search Report issued in International Patent Application No. PCT/CN2020/126274.
(Continued)

*Primary Examiner* — Ruiyun Zhang
(74) *Attorney, Agent, or Firm* — Oliff PLC (57) ABSTRACT

A karst channel type water inrush efficient-blocking ultra-high expansion grouting material, preparation, methods and application thereof, the grouting material includes macromolecule polymer particles A and a cross-linking solidifying fluid B, wherein the macromolecule polymer particles A are an inlaid type core-shell structure, primary macromolecule water-absorbent resin serves as an inner core, part of a gelling catalyzer is attached to an the inner core surface
(Continued)

forming a shell, and the gelling catalyzer permeates the inner core forming an inlaid structure; before use, the macromolecule polymer particle A and the cross-linking solidifying fluid B are stirred; and then obtained mixed liquid is used as the grouting material to be injected into a fracture of a rock mass fracture zone. By means of the grouting material, high-pressure large-flow karst water inrush can be efficiently treated, the blocking efficiency of water inrush is improved, and major underground engineering construction of China is further facilitated.

18 Claims, 3 Drawing Sheets (51) Int. Cl.
*C08F 220/06* (2006.01)
*C08J 3/16* (2006.01)
*C08J 3/24* (2006.01)
C04B 103/00 (2006.01)
C04B 111/00 (2006.01)
C04B 111/70 (2006.01)

(52) U.S. Cl.
CPC ............. *C08J 3/244* (2013.01); *C08J 3/245* (2013.01); *C04B 2103/0049* (2013.01); *C04B 2111/00663* (2013.01); *C04B 2111/00698* (2013.01); *C04B 2111/0075* (2013.01); *C04B 2111/70* (2013.01); *C08F 2800/20* (2013.01); *C08F 2810/20* (2013.01); *C08J 2333/02* (2013.01)

(58) Field of Classification Search
CPC ......... C04B 2111/0075; C04B 2111/70; C08F 220/06; C08F 2810/20; C08J 3/126; C08J 3/03; C08J 3/245
USPC .................................................. 523/200, 201
See application file for complete search history.

(56) References Cited

FOREIGN PATENT DOCUMENTS

| | | |
|---|---|---|
| CN | 103694676 A | 4/2014 |
| CN | 103724594 A | 4/2014 |
| CN | 107513148 A | 12/2017 |
| CN | 108976775 A | 12/2018 |
| CN | 109535306 A | 3/2019 |
| CN | 109535306 B | 8/2019 |
| CN | 110835449 A | 2/2020 |
| EP | 2 476 714 A1 | 7/2012 |

OTHER PUBLICATIONS

Jan. 11, 2021 Written Opinion of the International Searching Authority issued in International Patent Application No. PCT/CN2020/126274.

Jul. 1, 2020 Office Action issued in Chinese Patent Application No. 201911128522.9.

KARST CHANNEL TYPE WATER INRUSH EFFICIENT-BLOCKING ULTRA-HIGH EXPANSION GROUTING MATERIAL AND PREPARATION AND USING METHODS AND APPLICATION THEREOF

BACKGROUND

Technical Field

The present invention belongs to the technical field of blocking materials of underground engineering and particularly relates to a karst channel type water inrush efficient-blocking ultra-high expansion grouting material and preparation and using methods and application thereof.

Related Art

Information of the Related Art part is merely disclosed to increase the understanding of the overall background of the present invention, but is not necessarily regarded as acknowledging or suggesting, in any form, that the information constitutes the prior art known to a person of ordinary skill in the art.

Along with rapid development of the society, development of traffic engineering soars, the pace of the infrastructure construction is stepped up continuously, and projects such as railways, tunnels, highways and mines spring up increasingly. Especially, along with vigorous implementation of the 21$^{st}$ century maritime silk road, the eastern coastal region of China is in great need for intercity and inter-provincial traffic construction. As of the end of 2018, over 30,000 highway and railway tunnels have been built in China with the total mileage of over 35,000 km. Besides, tunnel lines of 5,289 km are under construction and tunnel lines of over 28,000 km are under planning. However, as the topography and landforms of China are complex and changeable, the construction usually passes through karst areas, unfavorable geological formations such as fractures, channels and karst caves are highly developed, the hydraulic connection is smooth and the disaster-causing risk is high, disasters caused by water inrush usually occur during underground engineering construction. In a construction period, water inrush, rock stratum instability collapse and other disasters form a great threat to the tunnel safety, causes considerable economic damage, engineering stagnation, environment destruction and even casualties, and severely threatens the social stability and economic development.

The key problem of frequent disasters of water inrush during tunnel construction lies in that the occurrence mechanism of water inrush collapse disasters of tunnels in the karst area is quite complicated, and the requirement for the disaster control technological level is extremely high. Although relevant scholars at home and abroad have developed different grouting materials for different project problems and proposed different treatment methods, the karst water-rich area has the features of high water replenishment, complex geological structure, powerful hydraulic connection, pressure state, large flow, high flow speed, and the like, the current grouting materials and the treatment technology system are lack of pertinence, effective blocking and reinforced treatment to avoid the disasters are hardly achieved, and consequently the tunnel engineering construction and the engineering operation remain in a high risk state.

A prior patent (authorized publication number: CN 109535306 B) of the present invention provides an expansion macromolecule grouting material for high-pressure large-flow karst water inrush treatment and a preparation method. The grouting material includes an acrylic acid solution, a cross-linking agent, an initiator, a surface cross-linking agent and carrier fluid. The expansion macromolecule grouting material has the technical advantages of a swelling ratio up to 101 to 304 times, adjustable expansion rate, environmental protection, no pollution and an efficient blocking treatment effect on karst water inrush, and remarkably improves the treatment efficiency of water inrush of the underground engineering. However, the inventor found in a further study that the expansion macromolecule grouting material for water blocking depends on that acrylic resin particles rapidly expand when meeting water, rapidly grow in size and squeeze one another to form a blocking body so as to achieve blocking of water inrush, but the patent clearly indicates that the carrier fluid of the grouting material only has the effect of carrying and conveying the acrylic resin particles and cannot react with the particles, and to sum up, the carrier fluid does not have the capacity of cross-linking and solidifying the acrylic resin particles.

SUMMARY

In view of the problems in the prior art, in order to further improve a blocking effect of a grouting material on karst water inrush, the present invention provides a karst channel type water inrush efficient-blocking ultra-high expansion grouting material and preparation and using methods and application thereof. Compositions and structures of acrylic resin particles and carrier fluid (hereinafter referred to as cross-linking solidifying fluid) are designed from the perspectives of a water-meeting swelling ratio, salt tolerance, a gelling solidifying rate, a water inrush blocking property, and the like by studying the relation between the structure and property of a high polymer and applying the molecular structure design theory. By means of the grouting material provided by the present invention, high-pressure large-flow karst water inrush can be efficiently treated, the water inrush blocking efficiency is improved, and major underground engineering construction of China is further facilitated.

A first objective of the present invention is to provide a preparation method of a karst channel type water inrush efficient-blocking ultra-high expansion grouting material.

A second objective of the present invention is to provide an ultra-high expansion grouting material prepared by the method.

A third objective of the present invention is to provide a using method of the ultra-high expansion grouting material prepared by the method.

A fourth objective of the present invention is to provide application of the ultra-high expansion grouting material prepared by the preparation method.

To achieve the above objectives, specifically, the following technical solutions are disclosed in the present invention:

First, the present invention discloses a preparation method of a karst channel type water inrush efficient-blocking ultra-high expansion grouting material, including the following steps:

(1) adding a cross-linking agent into an acrylic acid solution, then adding an active substance containing a hydrophilic group for polymerization reaction to obtain a precursor; wherein the synthetic method is a static solution polymerization method and this method is to prepare a polymerizing monomer and additives such as the cross-linking agent into a solution and place the solution at a certain temperature for reaction, the operation is simple, and the cost is low;

(2) adding an initiator into the precursor obtained in step (1), heating for reaction to obtain a colloidal polymer, and smashing and drying the colloidal polymer to obtain primary macromolecule water-absorbent resin particles; and (3) uniformly spraying a gelling catalyzer onto the primary macromolecule water-absorbent resin particles, then performing drying, thus forming a shell structure with gel formed by catalyzing a cross-linking solidifying fluid B on a surface of the gelling catalyzer through cross-linking, and making part of the gelling catalyzer permeate into the primary macromolecule water-absorbent resin particles to obtain macromolecule polymer particles A of an inlaid type core-shell structure, wherein the gelling catalyzer is a composition of polyethylene glycol (PEG), 4,4'-methylene bis(o-chloroaniline) (MOCA) and polyether polyol; and the cross-linking solidifying fluid B is a substance capable of reacting with water.

Further, in step (1), a mass fraction of the acrylic acid solution is 10% to 80%. A synthetic process of the macromolecule polymer particles is free radical copolymerization reaction, and a large amount of heat is released during the reaction; as the increase of a monomer concentration, a reaction rate is increased, the heat released during the reaction is more difficult to dissipate, consequently an autoacceleration effect of the reaction is more evident, the macromolecule polymer particles are prone to implosion in the synthetic process, polymer molecule chains become shorter, and consequently water absorbency of the macromolecule polymer particles is affected. When the monomer concentration is lower than 10%, polymerization for forming the gel is difficult. Moreover, the existence of excessive water-soluble matter unfavorably affects the gel strength of the polymer particles, increases the production energy consumption, and thus the present invention makes a recommendation that the mass fraction of the acrylic acid solution is 10% to 80%.

It should be understood that the mass fraction of the acrylic acid solution may be properly increased or decreased on the basis of the above range according to actual conditions, such as 10.01%, 10.1%, 80.01% or 80.1%, which still falls within the protection scope of the present invention. Besides, the adding amount of the subsequent other components, raw materials, and the like, and process parameters and the like may also be adjusted according to the actual conditions, which is not repeated hereafter.

Further, in step (1), the active substance containing the hydrophilic group includes: any one or a mixture of several of starch, polyvinyl alcohol, polyacrylamide, acrylamide, and the like or any one or a mixture of several of solutions of the above components, such as a starch solution, and a polyvinyl alcohol solution. These raw materials are rich in source, low in price and excellent in water absorbency. Likewise, cellulosic macromolecule water-absorbent resin serving as an active substance containing hydrophilic groups mentioned in the prior patent (authorized publication number: CN 109535306 B) of the present invention is not excluded, such as hydroxyethyl cellulose, methylcellulose or carboxymethylcellulose.

Further, in step (1), the cross-linking agent includes any one or a composition of several of N,N-methylene bisacrylamide, divinyl benzene, isocyanate, dipentaerythritol hexaacrylate and pentaerythrityl tetraethylhexanoate.

Further, in step (1), an adding ratio of the cross-linking agent is 0.3% to 2% of mass of the acrylic acid in step (1).

Experiments show that the variety and a cross-linking degree of the cross-linking agent have large influence on a water absorbent rate of the macromolecule polymer particles, as for the same type of cross-linking agent, as the increase of the use amount of the cross-linking agent, the water absorbency of the macromolecule polymer particles is decreased instead, but the gel strength is increased. From the perspective of improving the water absorbent rate of the macromolecule polymer particles, it is suggested that the cross-linking degree should be reduced as much as possible on the premise of guaranteeing the synthesis of the macromolecule polymer particles. Therefore, the use amount of the cross-linking agent is controlled to be 0.3% to 2% in the present invention.

Further, in step (2), the initiator is an inorganic peroxide initiator, such as sodium persulfate, potassium sodium persulfate, and ammonium persulfate. The initiator is generally a compound carrying a weak bond and being easy to break down into reactive species, also referred to as a free radical initiator, a type of compounds easy to break down into primary free radicals under heating.

Further, in step (2), the use amount, namely an adding ratio, of the initiator is 0.1% to 0.7% of mass of the acrylic acid in step (1), at which an initiation reaction rate is appropriate.

In step (2), a temperature of the polymerization reaction is 65° C. to 90° C., and the reaction time is 23 min to 119 min.

Further, in step (2), a drying condition is: aeration-drying at 100° C. to 200° C. for 20 min to 120 min. When a drying temperature is higher than 200° C., the macromolecule polymer particles are instable, the obtained macromolecule polymer particles A are prone to yellowing, and when the drying temperature is too low, the required drying time is too long, and the production efficiency is affected.

Further, in step (3), a mass ratio of the polyethylene glycol (PEG) to the 4,4'-methylene bis(o-chloroaniline) MOCA to the polyether polyol in the gelling catalyzer is (1-5):(1-5):(2-5).

Preferably, the gelling catalyzer is prepared into an aqueous solution so as to be conveniently and uniformly sprayed onto the surfaces of the primary macromolecule water-absorbent resin particles.

Further, the gelling catalyzer is prepared into an aqueous solution with a mass fraction of 50% to 90%. If the mass fraction of the gelling catalyzer solution is lower than 50%, the drying time is prolonged, and the energy consumption is increased, and if the mass fraction of the gelling catalyzer solution is higher than 90%, the gelling catalyzer hardly permeate into a surface of each of the particles uniformly.

Further, in step (3), the use amount of the gelling catalyzer solution accounts for 1% to 10% of the total mass of the particles. The gelling catalyzer acts to make the macromolecule polymer particles A absorb water and expand so as to promote the reaction process of the cross-linking solidifying fluid B with water, accelerate the gelling reaction process and improve the water inrush blocking efficiency.

Second, the present invention provides another method for preparing the precursor, differing from the foregoing preparation method in that: during preparation of the precursor in step (1), first, acrylic acid is incompletely neutralized with alkaline liquor to obtain an incompletely-neutralized solution containing the acrylic acid, and the incompletely-neutralized solution is mixed with a cross-linking agent, and then subjected to polymerization reaction with an active substance containing hydrophilic groups to obtain the precursor.

Further, the alkaline liquor may be slowly added into the acrylic acid solution in an ice-water bath for neutralization.

Further, the neutralization degree of the incompletely-neutralized solution is controlled to be 60% to 90%. Tests show that when the neutralization degree is too low, the viscosity of gel formed by the reaction is too high, and thus the gel is hardly smashed for subsequent operation. When the neutralization degree is too high, a concentration of carboxylate in a system is too high, a reaction rate decreases, a cross-linking degree of a product is low, the water solubility is improved, and consequently a water absorbent rate of the product decreases.

The alkaline liquor includes any one or a mixture of several of sodium hydroxide, calcium hydroxide and potassium hydroxide.

Further, a mass fraction of the alkaline liquor is controlled to be 10% to 60%, since too high concentration of the alkaline liquor will cause that the acrylic acid solution rapidly reacts with the alkaline liquor, a large amount of heat is released, the operation is not easy for production personnel, and the production efficiency is affected; and too low concentration of the alkaline liquor will cause that the adding amount of alkaline liquor is too large, a formed colloidal polymer is too high in a water content, thus being difficult to dry, and the production energy consumption is increased.

The neutralization degree refers to a degree of neutralization reaction, and in the present invention, part of the acrylic acid is neutralized with the alkaline liquor, e.g., 10% of acrylic acid monomers in the acrylic acid solution are neutralized, namely, the neutralization degree is 10%. By changing the neutralization degree of the acrylic acid, ratios of two groups, —COOH and —COONa, different in hydrophilia in resin can be changed, and thus the water absorbency of the product is influenced. In terms of reaction kinetics, the activity of the acrylic acid is higher than that of sodium acrylate, if the neutralization degree is low and the acidity is high, the polymerization reaction is not easy to control, many low-molecule polymers exist in the product, and the water absorbent rate is low; and when the neutralization degree is too high, hydrogen bond cross-linking reaction occurs among molecules, a compact net-shaped structure is formed, and thus the water absorbent rate of the product decreases. Therefore, the present invention recommends that the neutralization degree of the incompletely-neutralized solution remains between 40% and 90%.

Third, the present invention discloses a preparation method of the cross-linking solidifying fluid B, including the following steps:
S1, dehydrating polyether polyol: uniformly mixing polyether polyol and a plasticizer, then performing dehydration under a vacuum heating condition, cooling after dehydration is completed to obtain dehydrated polyether polyol and then putting the dehydrated polyether polyol in a dry container and sealing for standby application.
S2, synthesizing a prepolymer: dropwise adding polyisocyanate into the dehydrated polyether polyol under a heating condition, then heating for polymerization reaction, after reaching a reaction endpoint, cooling and discharging, and storing an obtained prepolymer in an airtight and dry container.
S3, adding a diluent into the prepolymer, and uniformly stirring to obtain the cross-linking solidifying fluid B.

Further, in S1, the vacuum heating condition is that: dehydration is performed at 110° C. to 120° C. and a vacuum degree of −0.08 MPa to 0.1 MPa for 2.5 h to 4 h, and after dehydration is completed, cooling to reach 50° C. or below.

Further, in S1, the polyether polyol is low-molecular-weight hydrophilic polyether with di-functionality or tri-functionality, such as polypropylene oxide glycol N204, polyether polyol N220, polyether polyol N240, polyether polyol N310 and polyether polyol 505S. The low-molecular-weight hydrophilic polyether with di-functionality or tri-functionality has the advantages that the viscosity is low, the fluidity is good, and a finished product is good in tenacity and high in elasticity, not only has water resistance, but also has excellent elastic deformation which can greatly reduce the damage caused by deformation during water resisting.

Further, in S1, the plasticizer includes any one or a mixture of several of phthalate ester, terephthalate, isophthalate, and the like.

Further, in S1, an adding mass ratio of the polyether polyol to the plasticizer is (2.94-5.88):(1-2.05).

Further, in S2, the isocyanate is toluene diisocyanate (TDI) or polymethylene polyphenyl polyisocyanate (PAPI) or methylene diphenyl diisocyanate (MDI) or combination thereof.

Further, in S2, the heating condition is heating to no more than 50° C., controlling a temperature to be constant, completing dropwise adding within 30 min, and after dropwise adding is completed, uniformly stirring.

Further, in S2, a temperature for heating for the polymerization reaction is 80° C. to 85° C. Optionally, the % content of —NCO is measured by sampling every 30 min till the content does not change basically, i.e., the reaction endpoint is reached.

Further, the reaction endpoint is reached when the —NCO % is controlled to be 7% to 12%, and as the increase of the —NCO % content in a system, the viscosity decreases gradually, the gelling time is shorter and water wrappage amount decreases. This is because as the increase of the —NCO % content, a content of a hard segment of the system increases, a content of a soft segment decreases, corresponding hydrophilic groups are reduced, and then the water wrappage amount decreases. If the —NCO % content continues to increase to 12% or above, grout reacts with water strongly, a reaction rate is very high, consequently the cross-linking solidifying fluid B has already reacted to form gel before polymer particles A have enough time to completely expand, and an expansion property of a material is reduced. Therefore, a formula preferred in the present invention is that the —NCO % content of the reaction system is controlled to be 7% to 12%.

Further, in S3, the diluent is acetone, preferably, an adding amount of the diluent is 15% to 35% of mass of the prepolymer, more preferably, 25% to 35%. As the increase of the use amount of the acetone, the viscosity of the grout obtained through reaction decreases, the decrease of the viscosity is large between 15% and 35% of the adding amount, the acetone continues to be added, and the viscosity of the grout still decreases but slowly; the water wrappage amount increases but then decreases as increase of the use amount of the acetone, and the overall change is small; and as the increase of the use amount of the acetone, the gelling time is prolonged, and the compressive strength of the gel is reduced to a certain degree. Therefore, when the present invention adopts the diluent within the above-mentioned range as a solvent of the cross-linking solidifying fluid B, an obtained grouting material is better in overall property.

Fourth, the present invention discloses an ultra-high expansion grouting material obtained through the preparation method, wherein the grouting material includes macromolecule polymer particles A and a cross-linking solidifying fluid B, the macromolecule polymer particles A are of an inlaid type core-shell structure and are a type of polyacrylic acid-series macromolecule water-absorbent resin, primary macromolecule water-absorbent resin obtained in step (2) serves as an inner core, part of a gelling catalyzer added in step (3) is attached to a surface of the inner core to form a shell, and meanwhile part of the gelling catalyzer permeates into the inner core to form an inlaid structure.

The inlaid type core-shell structure has the technical advantages that: a holding amount of the catalyzer is sufficient for catalysis after subsequent expansion only after permeating is performed, if only attachment to the surface of the inner core, a surface area of the macromolecule polymer particles A sharply increases after the particles A expand, resulting in that there is no enough catalyzer provided for catalyzing a large amount of the cross-linking solidifying fluid B in contact with the surfaces of the macromolecule polymer particles A for fully reacting. Moreover, the strong surface expansion may cause falling and loss of part of the catalyzer, which further reduces the catalyzer. Therefore, by making part of the gelling catalyzer permeate into the inner core to form the inlaid structure, pre-storing and supplementing the catalyzer may be achieved.

Fifth, the present invention provides a using method of the ultra-high expansion grouting material, specifically including: before use, separately storing macromolecule polymer particles A and a cross-linking solidifying fluid B; during use, stirring the macromolecule polymer particles A and the cross-linking solidifying fluid B for full mixing; and then injecting obtained mixed liquid as the grouting material into a fracture of a rock mass fracture zone.

The macromolecule polymer particles A rapidly absorb water and expand, a volume increases 200 times or more of an original volume, the cross-linking solidifying fluid B reacts with water in the fracture zone and water of surfaces of the macromolecule polymer particles, such that the expanded macromolecule polymer particles A are effectively bonded, the macromolecule polymer particles A and a broken rock mass in a stratum are more firmly bonded to form a gel solidified body, water inrush treatment in a water-rich fracture zone is achieved, and a technical problem that the grouting material is difficult to remain under the water inrush condition is effectively solved.

Further, a mass ratio of the macromolecule polymer particles A to the cross-linking solidifying fluid B is (1-3):(1-5).

Further, before use, a catalyzer or a retarder may be added into the cross-linking solidifying fluid B according to demands of engineering, and a solidifying rate of the cross-linking solidifying fluid B after meeting water is controlled.

Further, the catalyzer is formed by compounding of meta-toluenediamine, triethylenediamine and dibutyltin dilaurate. Preferably, a ratio of the meta-toluenediamine to the triethylenediamine to the dibutyltin dilaurate is (1-2):(1-2):(2-4). Amine and tin catalyzers have a 'synergistic effect', i.e., a catalysis effect when tertiary amine type catalyzers and organic tin catalyzers are used jointly is stronger than that of a single catalyzer.

Further, an adding amount of the catalyzer is 2% to 5% of mass of the cross-linking solidifying fluid B. Different water inrush geological environment has different requirements for properties of grout, especially for high-pressure large-flow water inrush, it is required that the grout has high setting rate, but for wide-fracture water inrush treatment, the grout needs to spread deeply into the stratum. Therefore, different geological environment brings about different requirements for setting time of the grout. In order to make the setting time of the grout controllable, the present invention achieves the control over a setting speed of the grout by adjusting the use amount of the catalyzer.

Further, the retarder is an organic weak acid type compound, such as tartaric acid and citric acid. The cross-linking solidifying fluid B is high in reaction activity and high in reaction rate, gelling may be achieved usually within less than twenty seconds, on the basis, in some cases, in order to increase a permeating radius of the grout in the stratum, prolonging the gelling time of the grout and adding a certain amount of retarder are necessary according to the engineering requirements.

Further, the use amount of the retarder is controlled to be 8% to 12%, and the gelling time of the cross-linking solidifying fluid B is adjustable between dozens of seconds and hundreds of seconds.

Finally, the present invention discloses application of the ultra-high expansion grouting material in the field of construction engineering, especially in karst water inrush blocking.

Compared with the prior art, the present invention has the following beneficial effects:

(1) the volume of the macromolecule polymer particles A rapidly expands after the particles A meet water, and the swelling ratio is up to 55-204 times or above, the catalyzer on the surfaces of the particles is exposed, the gelling reaction process of the cross-linking solidifying fluid B with water in the fracture zone is effectively promoted, the expanded macromolecule polymer particles A are effectively bonded to form the gel solidified body, and water inrush treatment of the water-rich fracture zone is achieved.

(2) Compared with the prior patent (authorized publication number: CN 109535306 B) of the present invention, the cross-linking solidifying fluid B plays a role in suspension and carrying the macromolecule polymer particles A and can react with the water in the stratum under the action of the catalyzer on the surfaces of the macromolecule polymer particles A, such that the expanded macromolecule polymer particles A are effectively bonded, the macromolecule polymer particles A and fractured rock mass in the stratum are bonded more firmly to form the elastic solidified body, water inrush treatment in the water-rich karst area is achieved, and the technical problem that the grouting material is difficult to remain under the water inrush condition is effectively solved.

(3) The setting time of the material of the present invention is steady and controllable, by means of the material of the present invention, grout setting can be effectively regulated according to the demands of the engineering, and it is guaranteed that the grout is good in operability and engineering applicability.

(4) The prepared ultra-high expansion macromolecule grouting material of the present invention achieves full composition of multi-component materials, a purpose of a super-superposition effect of all components is achieved, and an effect of effective blocking of water inrush in the water-rich karst area is achieved. Moreover, the grouting material has the technical advantages of being convenient to operate and safer.

BRIEF DESCRIPTION OF THE DRAWINGS

The accompanying drawings constituting a part of this application are used for providing further understanding for this application. Exemplary examples of this application and descriptions thereof are used for explaining this application and do not constitute any inappropriate limitation to this application.

FIG. 1 is an effect diagram of actual macromolecule polymer particles A prepared according to Example 1 of the present invention.

DETAILED DESCRIPTION

It should be noted that the following detailed descriptions are all exemplary and are intended to provide a further understanding of this application. Unless otherwise specified, all technical and scientific terms used herein have the same meaning as commonly understood by a person of ordinary skill in the art to which this application belongs.

It should be noted that terms used herein are only for describing specific implementations and are not intended to limit exemplary implementations according to the present application. As used herein, the singular form is also intended to include the plural form unless the context clearly dictates otherwise. In addition, it should further be understood that, terms "comprise" and/or "include" used in this application indicate that there are features, steps, operations, devices, components, and/or combinations thereof.

As mentioned above, as for problems in the prior art, in order to further improve a blocking effect of a grouting material on karst water inrush, the present invention provides a karst channel type water inrush efficient-blocking ultra-high expansion grouting material and preparation and using methods thereof. The present invention is further described below in conjunction with the accompanying drawings and the detailed description.

Example 1

Preparation of a karst channel type water inrush efficient-blocking ultra-high expansion grouting material includes the following steps:

1. Preparation of Macromolecule Polymer Particles A:
   (1) An acrylic acid neutralizing stage: firstly, 36 parts of an acrylic acid solution with a mass fraction of 10% and 5 parts of an acrylamide co-polymer solution with a mass fraction of 20% are prepared with ice water, and 12 parts of alkaline liquor with a mass fraction of 10% is added, so that an acrylic acid neutralized solution with a neutralization degree of 60% is obtained.
   (2) A polymerization reaction initiating stage: 0.072 part of a cross-linking agent N,N-methylene bisacrylamide is prepared into a solution with a mass fraction of 50%, added into the acrylic acid neutralized solution prepared in step (1), and uniformly stirred for 1 h, then an initiator solution with a mass fraction of 50% prepared from 0.025 part of potassium persulfate is added and heated to 80° C., and the reaction lasts for 23 min, so that a colloidal polymer is generated.
   (3) A drying and smashing stage: the colloidal polymer obtained in step (2) is smashed and put in a drying furnace at 100° C. for drying to reach a constant weight, and particles are smashed and screened, so that primary macromolecule water-absorbent resin particles are obtained.
   (4) 5 parts of a gelling catalyzer (a mass ratio of polyethylene glycol to 4,4'-methylene bis(o-chloroaniline) to polyether polyol being 2:1:2) of a cross-linking solidifying fluid B is prepared into a solution with a mass fraction of 50%, and the solution is uniformly sprayed onto the primary macromolecule water-absorbent resin particles obtained in step (3), which are then placed in a drying oven at 160° C. for forced air drying, so that macromolecule polymer particles A are obtained for standby application.

2. Preparation of the Cross-Linking Solidifying Fluid B:
   (1) Polyether polyol dehydration: 50 parts of polypropylene oxide glycol N204 (a hydroxyl value being 255 mgKOH/g, and a functionality degree being 2) and 17 parts of phthalate ester are added into a container with a stirrer and a thermometer, heated and stirred, then heated and vacuumized, dehydrated at 110° C. and a vacuum degree of −0.08 MPa for 3 h, then cooled to reach 50° C. or below, and put in a dry container and airtightly preserved for standby application.
   (2) Prepolymer synthesis: 100 parts of the dehydrated polyether polyol is accurately added into a dry there-necked flask, heated to 50° C., and stirred, 28 parts of toluene diisocyanate (TDI) is slowly and dropwise added, and a temperature is controlled so that dropwise adding is finished within 30 min. After dropwise adding is finished, the mixture is uniformly stirred, and heated to 80° C. for reaction, a —NCO % content is measured by sampling every 30 min during reaction (detection by a hydrochloric acid-di-n-butylamine method) till the —NCO mass % content is stabilized at 7.0%, i.e., a reaction endpoint is reached. Cooling and discharging are performed, and an obtained prepolymer is stored in an airtight and dry container.
   (3) 20 parts of an acetone diluent and 4 parts of a catalyzer with a ratio of toluenediamine to triethylenediamine to dibutyltin dilaurate being 1:1:2 are added to 80 parts of the prepolymer synthesized in step (2), and uniformly stirred, so as to obtain the cross-linking solidifying fluid B.

The macromolecule polymer particles A and the cross-linking solidifying fluid B prepared according to this example are uniformly mixed at a mass ratio of 1:1, so that the expansion macromolecule grouting material is obtained, various performance indexes of the grouting material are tested, and results are shown in tables 1.1 to 1.3.

A test method of a swelling ratio of the macromolecule polymer particles A is (the same method is adopted in other examples): 1 g of the macromolecule polymer particles A are put in a 400-mesh gauze and immersed in an aqueous solution, after the particles fully absorb water and expand, residual water on the surfaces of the particles is filtered out with filter paper, and the change of water-absorbing mass of the particles is recorded. A swelling ratio Sw (unit: (g/g)) is calculated by a following formula:

$$SW = \frac{M_n - M_0}{M_0} \times 100\%$$

where $M_0$ and $M_n$ respectively represent a mass of dry macromolecule polymer particles A and a mass of water-absorbed macromolecule polymer particles A.

A test method of an average gelling time of reaction between the cross-linking solidifying fluid B and tenfold water is (the same method is adopted in other examples): 10 g of the cross-linking solidifying fluid B is accurately weighed and put in a beaker, 100 ml of water is added, time $t_1$ at which the water is added is recorded, the mixture is uniformly stirred rapidly (for about 10 s), and then allowed for still standing, so that white emulsion is obtained, and then the change of the viscosity is constantly detected with a glass rod. When the glass rod leaves a liquid level and a drawing phenomenon occurs, it indicates that the sample has already been gelled, time $t_2$ is recorded, the gelling time $t=t_2-t_1$, an average value of repeated experiments is used as the average gelling time of reaction between B and the tenfold water.

A test method of a maximum swelling ratio of the expansion macromolecule grouting material is (the same method is adopted in other examples): grout is prepared according to a ratio, 1 part of the expansion macromolecule grouting material is put in 100 parts of pure water, after the material fully absorbs water and expands, residual water on the surface of the material is filtered out with filter paper, and the change of water-absorbing mass of the material is recorded. A swelling ratio Sw (unit: (g/g)) is calculated by a following formula:

$$S_{A+B} = \frac{M_2 - M_1}{M_1} \times 100\%$$

where $M_2$ and $M_1$ respectively represent masses of the expansion macromolecule grouting material before and after meeting water (unit: g).

Gelling time of the grouting material is recorded, and an average value of repeated tests is used.

A test method of average gelling time of reaction between the expansion macromolecule grouting material and tenfold water is (the same method is adopted in other examples): 10 g of the expansion macromolecule grouting material is accurately weighed and put in a beaker, 100 ml of water is added, time $t_3$ at which the water is added is recorded, the mixture is uniformly stirred rapidly, and then allowed for still standing, so that white emulsion is obtained, then a volume of the expansion macromolecule grouting material increases continuously, and the water in the beaker is completely absorbed and gel is formed is recorded, at the moment, time $t_4$ is recorded, gelling time $t=t_4-t_3$, an average value of repeated experiments is used as the average gelling time of reaction between the expansion macromolecule grouting material and the tenfold water.

TABLE 1.1

Macromolecule polymer particle A property test

| Maximum swelling ratio Sw of A in pure water$^{Sw}$ | Swelling ratio Sw in a NaCl solution with Cl ion concentration of 0.5 g/L |
|---|---|
| 204 g/g | 72.8 g/g |

TABLE 1.2

Cross-linking solidifying fluid B property test

| Appearance$^{Sw}$ | Relative density | Average gelling time of reaction between B and tenfold water |
|---|---|---|
| Light yellow liquid | 1.05 | 86.5 s |

TABLE 1.3

Expansion macromolecule grouting material property test

| A:B | Appearance | Maximum swelling ratio $S_{A+B}$ of A + B in pure water$^{Sw}$ | Average gelling time of reaction between A + B and tenfold water |
|---|---|---|---|
| 1:1 | Light yellow liquid | 108 g/g | 65.2 s |

Example 2

Preparation of a karst channel type water inrush efficient-blocking ultra-high expansion grouting material includes the following steps:

1. Preparation of Macromolecule Polymer Particles A:
   (1) An acrylic acid neutralizing stage: firstly, 36 parts of an acrylic acid solution with a mass fraction of 80% and 5 parts of an acrylamide co-polymer solution with a mass fraction of 10% are prepared with ice water, and 24 parts of alkaline liquor with a mass fraction of 60% is added, so that an acrylic acid neutralized solution with a neutralization degree of 90% is obtained.
   (2) A polymerization reaction initiating stage: 0.09 part of a cross-linking agent N,N-methylene bisacrylamide is prepared into a solution with a mass fraction of 50%, 5 parts of a gelling catalyzer (a ratio of polyethylene glycol to 4,4'-methylene bis(o-chloroaniline) to polyether polyol being 2:1:2) of a cross-linking solidifying fluid B is prepared into a solution with a mass fraction of 50%, the solutions are added into the acrylic acid neutralized solution prepared in step (1), uniformly stirred for 1 h, then an initiator solution with a mass fraction of 50% prepared from 0.03 part of potassium persulfate is added and heated to 80° C., and the reaction lasts for 57 min, so that a colloidal polymer is generated.
   (3) A drying and smashing stage: the colloidal polymer obtained in step (2) is smashed and put in a drying furnace at 200° C. for drying to reach a constant weight, and particles are smashed and screened, so that primary macromolecule water-absorbent resin particles are obtained.
   (4) 10 parts of a gelling catalyzer (a mass ratio of polyethylene glycol to 4,4'-methylene bis(o-chloroaniline) to polyether polyol being 2:1:2) of a cross-linking solidifying fluid B is prepared into a solution with a mass fraction of 50%, and the solution is uniformly sprayed onto the primary macromolecule water-absorbent resin particles obtained in step (3), which are then placed in a drying oven at 160° C. for forced air drying, so that macromolecule polymer particles A are obtained for standby application.
2. Preparation of the Cross-Linking Solidifying Fluid B:
   (1) Polyether polyol dehydration: 25 parts of polyether polyol PEG1000 (a hydroxyl value being 112 mgKOH/g, and a functionality degree being 2), 75 parts of polyether polyol 505S (a hydroxyl value being 56.3 mgKOH/g, and a functionality degree being 3) and 35 parts of phthalate ester are added into a container with a stirrer and a thermometer and heated and stirred, then heated and vacuumized, dehydrated at 120° C. and a vacuum degree of −0.1 MPa for 2.5 h, then cooled to 50° C. or below, and put in a dry container and airtightly preserved for standby application.

(2) Prepolymer synthesis: 100 parts of the dehydrated polyether polyol is accurately added into a dry therenecked flask, heated to 50° C., and stirred, 56 parts of methylene diphenyl diisocyanate (MDI) is slowly and dropwise added, and a temperature is controlled so that dropwise adding is finished within 30 min. After dropwise adding is finished, the mixture is uniformly stirred, and heated to 85° C. for reaction, a —NCO % content is measured by sampling every 30 min during reaction (detection by a hydrochloric acid-di-n-butylamine method) till the —NCO mass % content is stabilized at 8.2%, i.e., a reaction endpoint is reached. Cooling and discharging are performed, and an obtained prepolymer is stored in an airtight and dry container.

(3) 35 parts of an acetone diluent and 2 parts of a catalyzer with a ratio of toluenediamine to triethylenediamine to dibutyltin dilaurate being 1:1:2 are added to 65 parts of the prepolymer, and uniformly stirred, so that the cross-linking solidifying fluid B is obtained.

The macromolecule polymer particles A and the cross-linking solidifying fluid B prepared according to this example are mixed uniformly at a mass ratio of 3:5, so that the expansion macromolecule grouting material is obtained, various performance indexes of the grouting material are tested, and results are shown in tables 2.1 to 2.3.

TABLE 2.1

Macromolecule polymer particle A property test

| Maximum swelling ratio Sw of A in pure water$^{Sw}$ | Swelling ratio Sw in a NaCl solution with Cl ion concentration of 0.5 g/L |
|---|---|
| 161.7 g/g | 34.5 g/g |

TABLE 2.2

Cross-linking solidifying fluid B property test

| Appearance$^{Sw}$ | Relative density | Average gelling time of reaction between B and tenfold water |
|---|---|---|
| Light yellow liquid | 1.08 | 104.5 s |

TABLE 2.3

Expansion macromolecule grouting material property test

| A:B | Appearance | Maximum swelling ratio $S_{A+B}$ of A + B in pure water$^{Sw}$ | Average gelling time of reaction between A + B and tenfold water |
|---|---|---|---|
| 3:5 | Light yellow liquid | 72.6 g/g | 29.8 s |

Example 3

Preparation of a karst channel type water inrush efficient-blocking ultra-high expansion grouting material includes the following steps:

1. Preparation of Macromolecule Polymer Particles A:
   (1) An acrylic acid neutralizing stage: firstly, 36 parts of an acrylic acid solution with a mass fraction of 40% and 5 parts of an acrylamide co-polymer solution with a mass fraction of 10% are prepared with ice water, and 12 parts of alkaline liquor with a mass fraction of 50% is added, so that an acrylic acid neutralized solution with a neutralization degree of 75% is obtained.
   (2) A polymerization reaction initiating stage: 0.05 part of a cross-linking agent N,N-methylene bisacrylamide is prepared into a solution with a mass fraction of 50% and added into the acrylic acid neutralized solution prepared in step (1), and uniformly stirred for 1 h, then an initiator solution with a mass fraction of 50% prepared from 0.025 part of ammonium persulfate is added, and heated to 80° C., and the reaction lasts for 88 min, so that a colloidal polymer is generated.
   (3) A drying and smashing stage: the colloidal polymer obtained in step (2) is smashed and put in a drying furnace at 200° C. for drying to reach a constant weight, and particles are smashed and screened, so that primary macromolecule water-absorbent resin particles are obtained.
   (4) 10 parts of a gelling catalyzer (a mass ratio of polyethylene glycol to 4,4'-methylene bis(o-chloroaniline) to polyether polyol being 1:1:4) of a cross-linking solidifying fluid B is prepared into a solution with a mass fraction of 50%, and the solution is uniformly sprayed onto the primary macromolecule water-absorbent resin particles obtained in step (3), which are then placed a drying oven at 160° C. for forced air drying, so that macromolecule polymer particles A are obtained for standby application.

2. Preparation of the Cross-Linking Solidifying Fluid B:
   (1) Polyether polyol dehydration: 35 parts of polyether polyol PEG1000 (a hydroxyl value being 112 mgKOH/g, and a functionality degree being 2), 65 parts of polyether polyol 505S (a hydroxyl value being 56.3 mgKOH/g, and a functionality degree being 3) and 35 parts of isophthalate are added into a container with a stirrer and a thermometer and heated and stirred, then heated and vacuumized, dehydrated at 110° C. and a vacuum degree of −0.095 MPa for 3 h, then cooled to 50° C. or below, and an obtained product is put in a dry container and airtightly preserved for standby application.
   (2) Prepolymer synthesis: 100 parts of the dehydrated polyether polyol is accurately added into a dry container, heated to 50° C., and stirred, 56 parts of polymethylene polyphenyl polyisocyanate (PAPI) is slowly and dropwise added, and a temperature is controlled so that dropwise adding is finished within 30 min. After dropwise adding is finished, the mixture is uniformly stirred, heated to 85° C. for reaction, a —NCO % content is measured by sampling every 30 min during reaction (detection by a hydrochloric acid-di-n-butylamine method) till the —NCO mass % content is stabilized at 9.8%, i.e., a reaction endpoint is reached. Cooling and discharging are performed, and an obtained prepolymer is stored in an airtight and dry container.
   (3) 30 parts of an acetone diluent and 3 parts of a catalyzer with a ratio of toluenediamine to triethylenediamine to dibutyltin dilaurate of 1:1:2 are added to 70 parts of the prepolymer synthesized in step (2), and uniformly stirred, so that the cross-linking solidifying fluid B is obtained.

The macromolecule polymer particles A and the cross-linking solidifying fluid B prepared according to this example are mixed uniformly at a mass ratio of 2:3, so that the expansion macromolecule grouting material is obtained, various performance indexes of the grouting material are tested, and results are shown in tables 3.1 to 3.3.

TABLE 3.1

Macromolecule polymer particle A property test

| Maximum swelling ratio Sw of A in pure water$^{Sw}$ | Swelling ratio Sw in a NaCl solution with Cl ion concentration of 0.5 g/L |
|---|---|
| 183.6 g/g | 56.4 g/g |

TABLE 3.2

Cross-linking solidifying fluid B property test

| Appearance$^{Sw}$ | Relative density | Average gelling time of reaction between B and tenfold water |
|---|---|---|
| Light yellow liquid | 1.12 | 98.7 s |

TABLE 3.3

Expansion macromolecule grouting material property test

| A:B | Appearance | Maximum swelling ratio $S_{A+B}$ of A + B in pure water$^{Sw}$ | Average gelling time of reaction between A + B and tenfold water |
|---|---|---|---|
| 2:3 | Light yellow liquid | 85.4 g/g | 46.5 s |

Example 4

Preparation of a karst channel type water inrush efficient-blocking ultra-high expansion grouting material includes the following steps:

1. Preparation of Macromolecule Polymer Particles A:
   (1) An acrylic acid neutralizing stage: firstly, 36 parts of an acrylic acid solution with a mass fraction of 30% and 8 parts of an acrylamide co-polymer solution with a mass fraction of 10% are prepared with ice water, and 9.6 parts of alkaline liquor with a mass fraction of 50% is added, so that an acrylic acid neutralized solution with a neutralization degree of 80% is obtained.
   (2) A polymerization reaction initiating stage: 0.05 part of a cross-linking agent N,N-methylene bisacrylamide is prepared into a solution with a mass fraction of 50% and added into the acrylic acid neutralized solution prepared in step (1), and uniformly stirred for 1 h, then an initiator solution with a mass fraction of 50% prepared from 0.05 part of ammonium persulfate is added, and heated to 80° C., and the reaction lasts for 119 min, so that a colloidal polymer is generated.
   (3) A drying and smashing stage: the colloidal polymer obtained in step (2) is smashed and put in a drying furnace at 200° C. for drying to reach a constant weight, and particles are smashed and screened, so that primary macromolecule water-absorbent resin particles are obtained.
   (4) 5 parts of a gelling catalyzer (a mass ratio of polyethylene glycol to 4,4'-methylene bis(o-chloroaniline) to polyether polyol being 1:2:3) of a cross-linking solidifying fluid B is prepared into a solution with a mass fraction of 50%, and the solution is uniformly sprayed onto the primary macromolecule water-absorbent resin particles obtained in step (3), which are then placed a drying oven at 160° C. for forced air drying, so that macromolecule polymer particles A are obtained.
2. Preparation of the Cross-Linking Solidifying Fluid B:
   (1) Polyether polyol dehydration: 25 parts of polyether polyol N330 (a hydroxyl value being 57 mgKOH/g, and a functionality degree being 2), 75 parts of polyether polyol N310 (a hydroxyl value being 165 mgKOH/g, and a functionality degree being 3) and 35 parts of terephthalate are added into a container with a stirrer and a thermometer and heated and stirred, then heated and vacuumized, dehydrated at 115° C. and a vacuum degree of −0.095 MPa for 2.5 h, then cooled to 50° C. or below, and an obtained product is put in a dry container and airtightly preserved for standby application.
   (2) Prepolymer synthesis: 100 parts of the dehydrated polyether polyol is accurately added into a dry container, heated to 50° C., and stirred, 50 parts of polymethylene polyphenyl polyisocyanate (PAPI) is slowly and dropwise added, and a temperature is controlled so that dropwise adding is finished within 30 min. After dropwise adding is finished, the mixture is uniformly stirred, and heated to 85° C. for reaction, a —NCO % content is measured by sampling every 30 min during reaction (detection by a hydrochloric acid-di-n-butylamine method) till the —NCO mass % content is stabilized at 10.2%, i.e., a reaction endpoint is reached. Cooling and discharging are performed, and an obtained prepolymer is stored in an airtight and dry container.
   (3) 30 parts of an acetone diluent and 8 parts of a catalyzer with a ratio of toluenediamine to triethylenediamine to dibutyltin dilaurate being 1:1:2 are added to 70 parts of the prepolymer synthesized in step (2), and uniformly stirred, so that the cross-linking solidifying fluid B is obtained.

The macromolecule polymer particles A and the cross-linking solidifying fluid B prepared according to this example are mixed uniformly at a mass ratio of 2:1, so that the expansion macromolecule grouting material is obtained, various performance indexes of the grouting material are tested, and results are shown in tables 4.1 to 4.3.

TABLE 4.1

Macromolecule polymer particle A property test

| Maximum swelling ratio Sw of A in pure waterSw | Swelling ratio Sw in a NaCl solution with Cl ion concentration of 0.5 g/L |
|---|---|
| 195.2 g/g | 66.8 g/g |

TABLE 4.2

Cross-linking solidifying fluid B property test

| AppearanceSw | Relative density | Average gelling time of reaction between B and tenfold water |
|---|---|---|
| Light yellow liquid | 1.09 | 84.2 s |

TABLE 4.3

Expansion macromolecule grouting material property test

| A:B | Appearance | Maximum swelling ratio $S_{A+B}$ of A + B in pure water Sw | Average gelling time of reaction between A + B and tenfold water |
|---|---|---|---|
| 2:1 | Light yellow liquid | 94.3 g/g | 57.3 s |

Example 5

Preparation of a karst channel type water inrush efficient-blocking ultra-high expansion grouting material includes the following steps:

1. Preparation of Macromolecule Polymer Particles A:
   (1) An acrylic acid neutralizing stage: firstly, 36 parts of an acrylic acid solution with a mass fraction of 50% and 10 parts of an acrylamide co-polymer solution with a mass fraction of 10% are prepared with ice water, and 14 parts of alkaline liquor with a mass fraction of 50% is added, so that an acrylic acid neutralized solution with a neutralization degree of 75% is obtained.
   (2) A polymerization reaction initiating stage: 0.27 part of a cross-linking agent N,N-methylene bisacrylamide is prepared into a solution with a mass fraction of 50% and added into the acrylic acid neutralized solution prepared in step (1), uniformly stirred for 1 h, then an initiator solution with a mass fraction of 50% prepared from 0.09 part of ammonium persulfate is added, and heated to 80° C., and the reaction lasts for 119 min, so that a colloidal polymer is generated.
   (3) A drying and smashing stage: the colloidal polymer obtained in step (2) is smashed and put in a drying furnace at 100° C. for drying to reach a constant weight, and particles are smashed and screened, so that primary macromolecule water-absorbent resin particles are obtained.
   (4) 5 parts of a gelling catalyzer (a mass ratio of polyethylene glycol to 4,4'-methylene bis(o-chloroaniline) to polyether polyol being 2:1:2) of a cross-linking solidifying fluid B is prepared into a solution with a mass fraction of 50%, and the solution is uniformly sprayed onto the primary macromolecule water-absorbent resin particles obtained in step (3), which are then placed a drying oven at 160° C. for forced air drying, so that macromolecule polymer particles A are obtained for standby application.
2. Preparation of the Cross-Linking Solidifying Fluid B:
   (1) Polyether polyol dehydration: 30 parts of polyether polyol N210 (a hydroxyl value being 117 mgKOH/g, and a functionality degree being 2), 70 parts of polyether polyol N220 (a hydroxyl value being 57 mgKOH/g, and a functionality degree being 3) and 30 parts of isophthalate are added into a container with a stirrer and a thermometer and heated and stirred, then heated and vacuumized, dehydrated at 120° C. and a vacuum degree of −0.095 MPa for 2.5 h, then cooled to 50° C. or below, and an obtained product is put in a dry container and airtightly preserved for standby application.
   (2) Prepolymer synthesis: the dehydrated polyether polyol is accurately added into a dry container according to the amount of a formula, heated to 50° C., and stirred, 56 parts of toluene diisocyanate (TDI) is slowly and dropwise added, and a temperature is controlled so that dropwise adding is finished within 30 min. After dropwise adding is finished, the mixture is uniformly stirred, and heated to 85° C. for reaction, a —NCO % content is measured by sampling every 30 min during reaction (detection by a hydrochloric acid-di-n-butylamine method) till the —NCO mass % content is stabilized at 11.3%, i.e., a reaction endpoint is reached. Cooling and discharging are performed, and an obtained prepolymer is stored in an airtight and dry container.
   (3) 25 parts of an acetone diluent and 5 parts of a catalyzer with a ratio of toluenediamine to triethylenediamine to dibutyltin dilaurate being 1:1:2 are added to 75 parts of the prepolymer synthesized in step (2), and uniformly stirred, so that the cross-linking solidifying fluid B is obtained.

The macromolecule polymer particles A and the cross-linking solidifying fluid B prepared according to this example are mixed uniformly at a mass ratio of 3:2, so that the expansion macromolecule grouting material is obtained, various performance indexes of the grouting material are tested, and results are shown in tables 5.1 to 5.3.

TABLE 5.1

Macromolecule polymer particle A property test

| Maximum swelling ratio Sw of A in pure water Sw | Swelling ratio Sw in a NaCl solution with Cl ion concentration of 0.5 g/L |
|---|---|
| 174.5 g/g | 46.5 g/g |

TABLE 5.2

Cross-linking solidifying fluid B property test

| Appearance Sw | Relative density | Average gelling time of reaction between B and tenfold water |
|---|---|---|
| Light yellow liquid | 1.10 | 83.5 s |

TABLE 5.3

Expansion macromolecule grouting material property test

| A:B | Appearance | Maximum swelling ratio $S_{A+B}$ of A + B in pure water Sw | Average gelling time of reaction between A + B and tenfold water |
|---|---|---|---|
| 3:2 | Light yellow liquid | 78.3 g/g | 40.1 s |

Example 6

Preparation of a karst channel type water inrush efficient-blocking ultra-high expansion grouting material includes the following steps:

1. Preparation of Macromolecule Polymer Particles A:
   (1) An acrylic acid neutralizing stage: firstly, 36 parts of an acrylic acid solution with a mass fraction of 30% and 5 parts of an acrylamide co-polymer solution with a mass fraction of 10% are prepared with ice water, and 8.4 parts of alkaline liquor with a mass fraction of 30% is added, so that an acrylic acid neutralized solution with a neutralization degree of 70% is obtained.

(2) A polymerization reaction initiating stage: 0.1 part of a cross-linking agent, i.e., N,N-methylene bisacrylamide is prepared into a solution with a mass fraction of 50% and added into the acrylic acid neutralized solution prepared in step (1), and uniformly stirred for 1 h, then an initiator solution with a mass fraction of 50% prepared from 0.05 part of potassium persulfate is added, and heated to 80° C., and the reaction lasts for 105 min, so that a colloidal polymer.

(3) A drying and smashing stage: the colloidal polymer obtained in step (2) is smashed and put in a drying furnace at 100° C. for drying to reach a constant weight, and particles are smashed and screened, so that primary macromolecule water-absorbent resin particles are obtained.

(4) 5 parts of a gelling catalyzer (a mass ratio of polyethylene glycol to 4,4'-methylene bis(o-chloroaniline) to polyether polyol being 2:1:2) of a cross-linking solidifying fluid B is prepared into a solution with a mass fraction being 50%, and the solution is uniformly sprayed onto the primary macromolecule water-absorbent resin particles obtained in step (3), which are then placed a drying oven at 160° C. for forced air drying, so that macromolecule polymer particles A are obtained for standby application.

2. Preparation of the Cross-Linking Solidifying Fluid B:

(1) Polyether polyol dehydration: 30 parts of polyether polyol N303 (a hydroxyl value being 560 mgKOH/g, and a functionality degree being 2), 70 parts of polyether polyol N240 (a hydroxyl value being 28 mgKOH/g, and a functionality degree being 3) and 30 parts of isophthalate are added into a container with a stirrer and a thermometer and heated and stirred, then heated and vacuumized, dehydrated at 110° C. and a vacuum degree of −0.08 MPa for 4 h, and then cooled to 50° C. or below, and an obtained product is put in a dry container and airtightly preserved for standby application.

(2) Prepolymer synthesis: the dehydrated polyether polyol is accurately added into a dry container according to the amount of a formula, heated to 50° C., and stirred, 56 parts of toluene diisocyanate (TDI) is slowly and dropwise added, and a temperature is controlled so that dropwise adding is finished within 30 min. After dropwise adding is finished, the mixture is uniformly stirred, and heated to 85° C. for reaction, a —NCO % content is measured by sampling every 30 min during reaction (detection by a hydrochloric acid-di-n-butylamine method) till the —NCO mass % content is stabilized at 10.9%, i.e., a reaction endpoint is reached. Cooling and discharging are performed, and an obtained prepolymer is stored in an airtight and dry container.

(3) 25 parts of an acetone diluent and 4 parts of a catalyzer with a ratio of toluenediamine to triethylenediamine to dibutyltin dilaurate being 1:1:2 are added to 75 parts of the prepolymer synthesized in step (2), and uniformly stirred, so that the cross-linking solidifying fluid B is obtained.

The macromolecule polymer particles A and the cross-linking solidifying fluid B prepared according to this example are mixed uniformly at a mass ratio of 1:1, so that the expansion macromolecule grouting material is obtained, various performance indexes of the grouting material are tested, and results are shown in tables 6.1 to 6.3.

TABLE 6.1

Macromolecule polymer particle A property test

| Maximum swelling ratio Sw of A in pure waterSw | Swelling ratio Sw in a NaCl solution with Cl ion concentration of 0.5 g/L |
|---|---|
| 185.1 g/g | 52.9 g/g |

TABLE 6.2

Cross-linking solidifying fluid B property test

| AppearanceSw | Relative density | Average gelling time of reaction between B and tenfold water |
|---|---|---|
| Light yellow liquid | 1.11 | 91.5 s |

TABLE 6.3

Expansion macromolecule grouting material property test

| A:B | Appearance | Maximum swelling ratio $S_{A+B}$ of A + B in pure waterSw | Average gelling time of reaction between A + B and tenfold water |
|---|---|---|---|
| 1:1 | Light yellow liquid | 84.2 g/g | 41.8 s |

Example 7

Preparation of a karst channel type water inrush efficient-blocking ultra-high expansion grouting material includes the following steps:

1. Preparation of Macromolecule Polymer Particles A:

(1) An acrylic acid neutralizing stage: firstly, 36 parts of an acrylic acid solution with a mass fraction of 50% and 10 parts of an acrylamide co-polymer solution with a mass fraction of 10% are prepared with ice water, and 14 parts of alkaline liquor with a mass fraction of 50% is added, so that an acrylic acid neutralized solution with a neutralization degree of 75% is obtained.

(2) A polymerization reaction initiating stage: 0.31 part of a cross-linking agent N,N-methylene bisacrylamide is prepared into a solution with a mass fraction of 50% and added into the acrylic acid neutralized solution prepared in step (1), and uniformly stirred for 1 h, then an initiator solution with a mass fraction of 50% prepared from 0.11 part of ammonium persulfate is added, and heated to 80° C., and the reaction lasts for 119 min, so that a colloidal polymer is generated.

(3) A drying and smashing stage: the colloidal polymer obtained in step (2) is smashed and put in a drying furnace at 100° C. for drying to reach a constant weight, and particles are smashed and screened, so that primary macromolecule water-absorbent resin particles are obtained.

(4) 2 parts of a gelling catalyzer (a mass ratio of polyethylene glycol to 4,4'-methylene bis(o-chloroaniline) to polyether polyol being 2:1:2) of a cross-linking solidifying fluid B is prepared into a solution with a mass fraction being 50%, and the solution is uniformly sprayed onto the primary macromolecule water-absorbent resin particles obtained in step (3), which are then placed a drying oven at 160° C. for forced air drying, so that macromolecule polymer particles A are obtained for standby application.

2. Preparation of the Cross-Linking Solidifying Fluid B:
(1) Polyether polyol dehydration: 30 parts of polyether polyol N210 (a hydroxyl value being 117 mgKOH/g, and a functionality degree being 2), 70 parts of polyether polyol N220 (a hydroxyl value being 57 mgKOH/g, and a functionality degree being 3) and 20 parts of isophthalate are added into a container with a stirrer and a thermometer and heated and stirred, then heated and vacuumized, dehydrated at 115° C. and a vacuum degree of −0.095 MPa for 3.5 h, then cooled to 50° C. or below, and an obtained product is put in a dry container and airtightly preserved for standby application.
(2) Prepolymer synthesis: the dehydrated polyether polyol is accurately added into a dry container according to the amount of a formula, heated to 50° C., and stirred, 56 parts of toluene diisocyanate (TDI) is slowly and dropwise added, and a temperature is controlled so that dropwise adding is finished within 30 min. After dropwise adding is finished, the mixture is uniformly stirred, and heated to 85° C. for reaction, a —NCO % content is measured by sampling every 30 min during reaction (detection by a hydrochloric acid-di-n-butylamine method) till the —NCO mass % content is stabilized at 12.0%, i.e., a reaction endpoint is reached. Cooling and discharging are performed, and an obtained prepolymer is stored in an airtight and dry container.
(3) 25 parts of an acetone diluent and 8 parts of a retarder tartaric acid are added to 75 parts of the prepolymer synthesized in step (2), and uniformly stirred, so that the cross-linking solidifying fluid B is obtained.

The macromolecule polymer particles A and the cross-linking solidifying fluid B prepared according to this example are mixed uniformly at a mass ratio of 3:4, so that the expansion macromolecule grouting material is obtained, various performance indexes of the grouting material are tested, and results are shown in tables 7.1 to 7.3.

TABLE 7.1

Macromolecule polymer particle A property test

| Maximum swelling ratio Sw of A in pure waterSw | Swelling ratio Sw in a NaCl solution with Cl ion concentration of 0.5 g/L |
|---|---|
| 186.2 g/g | 43.2 g/g |

TABLE 7.2

Cross-linking solidifying fluid B property test

| AppearanceSw | Relative density | Average gelling time of reaction between B and tenfold water |
|---|---|---|
| Light yellow liquid | 1.11 | 256.5 s |

TABLE 7.3

Expansion macromolecule grouting material property test

| A:B | Appearance | Maximum swelling ratio $S_{A+B}$ of A + B in pure waterSw | Average gelling time of reaction between A + B and tenfold water |
|---|---|---|---|
| 3:4 | Light yellow liquid | 75.3 g/g | 187.5 s |

Example 8

Preparation of a karst channel type water inrush efficient-blocking ultra-high expansion grouting material includes the following steps:
1. Preparation of Macromolecule Polymer Particles A:
(1) An acrylic acid neutralizing stage: firstly, 36 parts of an acrylic acid solution with a mass fraction of 50% and 10 parts of an acrylamide co-polymer solution with a mass fraction of 10% are prepared with ice water, and 14 parts of alkaline liquor with a mass fraction of 50% is added, so that an acrylic acid neutralized solution with a neutralization degree of 75% is obtained.
(2) A polymerization reaction initiating stage: 0.23 part of a cross-linking agent N,N-methylene bisacrylamide is prepared into a solution with a mass fraction of 50% and added into the acrylic acid neutralized solution prepared in step (1), and uniformly stirred for 1 h, then an initiator solution with a mass fraction of 50% prepared from 0.1 part of ammonium persulfate is added, and heated to 80° C., and the reaction lasts for 119 min, so that a colloidal polymer is generated.
(3) A drying and smashing stage: the colloidal polymer obtained in step (2) is smashed and put in a drying furnace at 100° C. for drying to reach a constant weight, and particles are smashed and screened, so that primary macromolecule water-absorbent resin particles are obtained.
(4) 3 parts of a gelling catalyzer (a mass ratio of polyethylene glycol to 4,4'-methylene bis(o-chloroaniline) to polyether polyol being 1:1:2) of a cross-linking solidifying fluid B is prepared into a solution with a mass fraction of 50%, and the solution is uniformly sprayed onto the primary macromolecule water-absorbent resin particles obtained in step (3), which are then placed a drying oven at 160° C. for forced air drying, so that macromolecule polymer particles A are obtained for standby application.
2. Preparation of the Cross-Linking Solidifying Fluid B:
(1) Polyether polyol dehydration: 30 parts of polyether polyol N210 (a hydroxyl value being 117 mgKOH/g, and a functionality degree being 2), 70 parts of polyether polyol N220 (a hydroxyl value being 57 mgKOH/g, and a functionality degree being 3) and 20 parts of isophthalate are added into a container with a stirrer and a thermometer and heated and stirred, then heated and vacuumized, dehydrated at 120° C. and a vacuum degree of −0.095 MPa for 3 h, then cooled to 50° C. or below, and an obtained product is put in a dry container and airtightly preserved for standby application.
(2) Prepolymer synthesis: dehydrated polyether polyol is accurately added into a dry container according to the amount of a formula, heated to 50° C., and stirred, 60 parts of toluene diisocyanate (TDI) is slowly and dropwise added, and a temperature is controlled so that dropwise adding is finished within 30 min. After dropwise adding is finished, the mixture is uniformly stirred, and heated to 85° C. for reaction, a —NCO % content is measured by sampling every 30 min during reaction (detection by a hydrochloric acid-di-n-butylamine method) till the —NCO mass % content is stabilized at 10.9%, i.e., a reaction endpoint is reached. Cooling and discharging are performed, and an obtained prepolymer is stored in an airtight and dry container.

(3) 30 parts of an acetone diluent and 12 parts of a retarder namely citric acid are added to 70 parts of the prepolymer synthesized in step (2), and uniformly stirred, so that the cross-linking solidifying fluid B is obtained.

The macromolecule polymer particles A and the cross-linking solidifying fluid B prepared according to this example are mixed uniformly at a mass ratio of 3:4, so that the expansion macromolecule grouting material is obtained, various performance indexes of the grouting material are tested, and results are shown in tables 8.1 to 8.3.

TABLE 8.1

Macromolecule polymer particle A property test

| Maximum swelling ratio Sw of A in pure waterSw | Swelling ratio Sw in a NaCl solution with Cl ion concentration of 0.5 g/L |
| --- | --- |
| 191.2 g/g | 55 g/g |

TABLE 8.2

Cross-linking solidifying fluid B property test

| AppearanceSw | Relative density | Average gelling time of reaction between B and tenfold water |
| --- | --- | --- |
| Light yellow liquid | 1.08 | 341.5 s |

TABLE 8.3

Expansion macromolecule grouting material property test

| A:B | Appearance | Maximum swelling ratio $S_{A+B}$ of A + B in pure waterSw | Average gelling time of reaction between A + B and tenfold water |
| --- | --- | --- | --- |
| 3:4 | Light yellow liquid | 95.8 g/g | 287.5 s |

Figure 1:
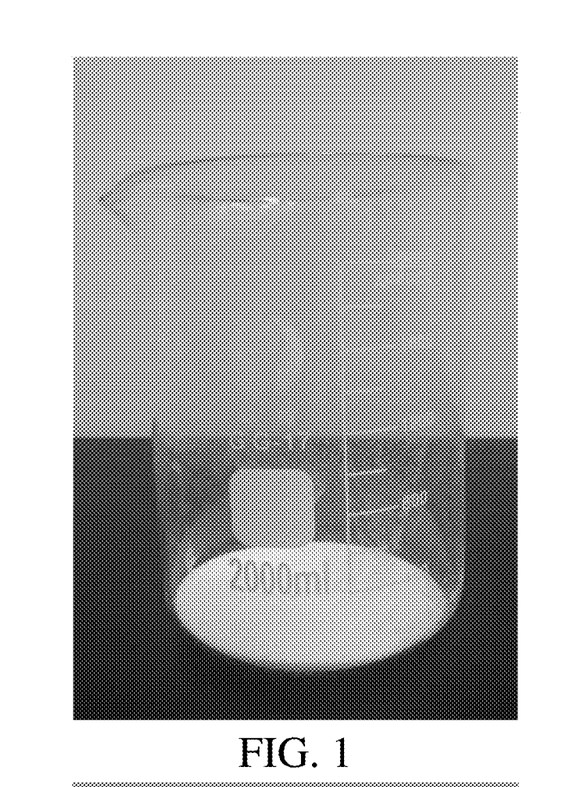
Figure 2:
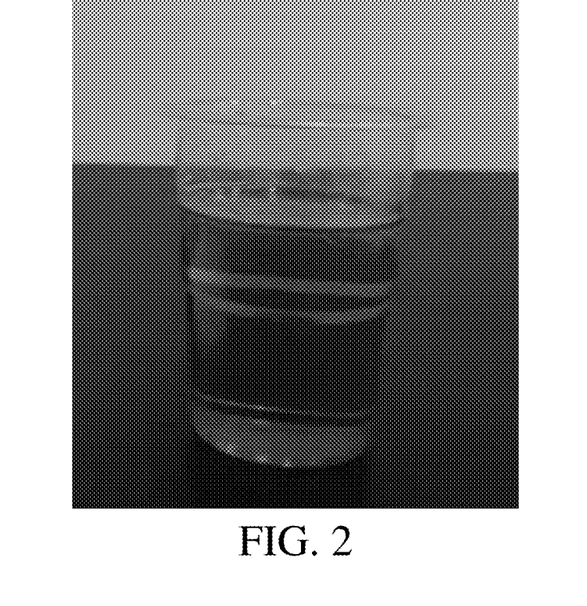
FIG. 2 is an effect diagram of actual cross-linking solidifying fluid B prepared according to Example 1 of the present invention.
Figure 3:
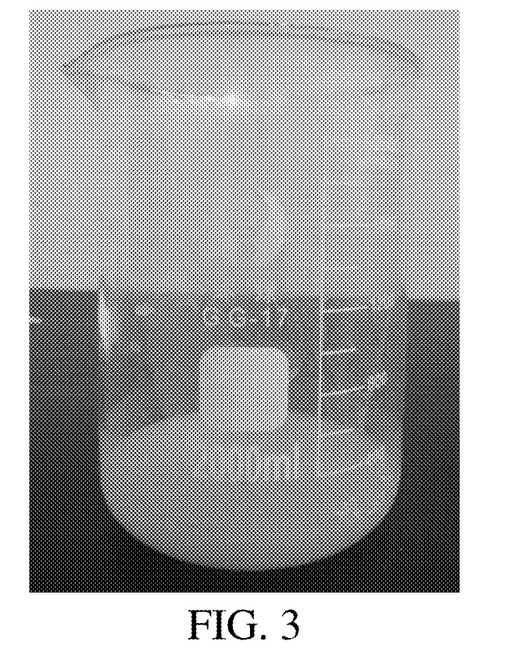
FIG. 3 is an effect diagram of an actual expansion macromolecule grouting material prepared from the macromolecule polymer particles A and cross-linking solidifying fluid B prepared according to Example 1 of the present invention.
Figure 4:
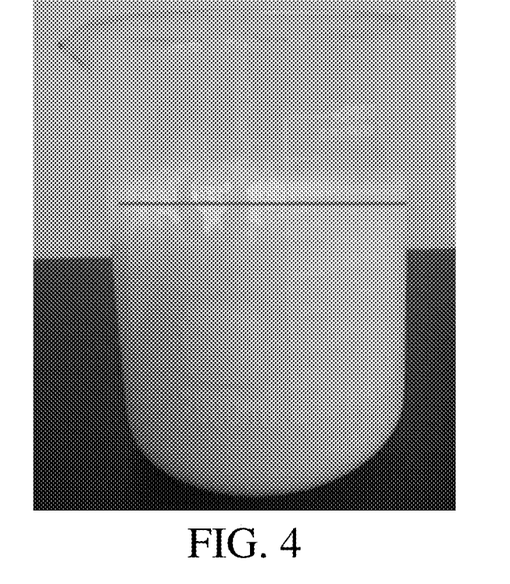
FIG. 4 is an effect diagram of an actual expansion macromolecule grouting material in FIG. 3 after expanding when meeting water.
Figure 5:
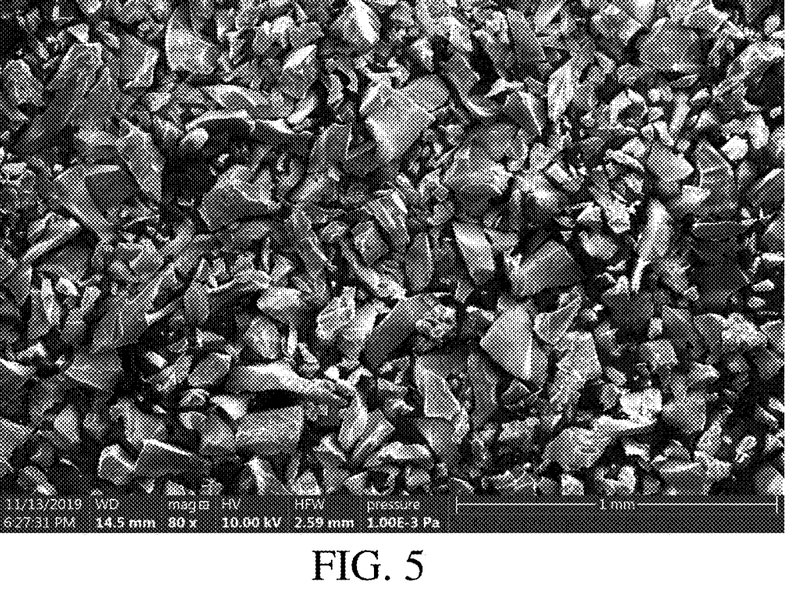
FIG. 5 is an SEM graph of macromolecule polymer particles A prepared according to Example 1 of the present invention.
Figure 6:
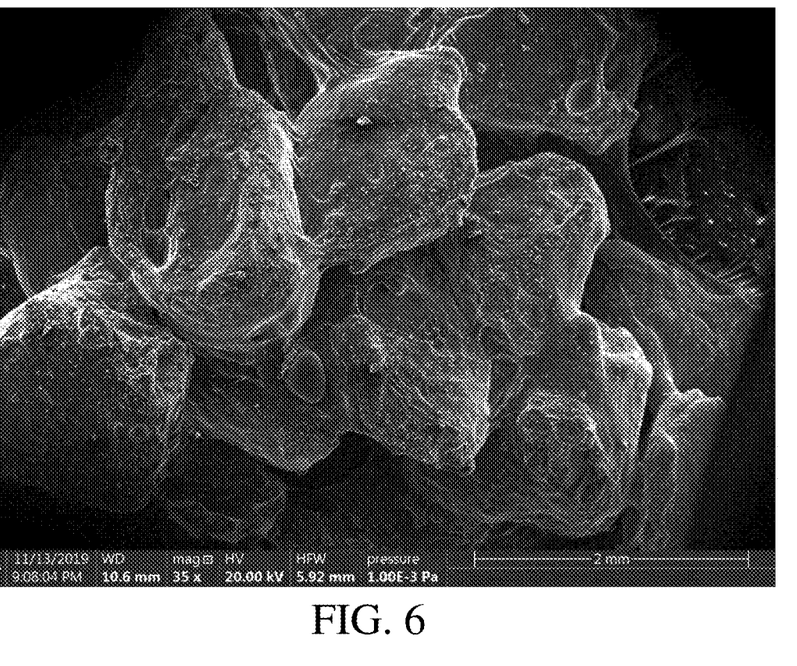
FIG. 6 is an SEM graph of a solidified body formed by cross-linking of the macromolecule polymer particles A prepared according to Example 1 of the present invention.

With reference to FIG. 1 to FIG. 6 and in conjunction with test data in tables 1-8, it can be seen that the swelling ratio of the macromolecule polymer particles A is up to 55-204 times or above when the particles meet water. That is because the cross-linking solidifying fluid B reacts with water in the stratum under the action of the surface catalyzer of the macromolecule polymer particles A, so that the expanded macromolecule polymer particles A are effectively bonded, the macromolecule polymer particles A are bonded more firmly to form an elastic solidified body, water inrush treatment in the karst area is more facilitated, and the technical problem that the grouting material is difficult to remain under the water inrush condition is effectively solved in a mode of 'expanding while meeting water and blocking water with water'.

Besides, the setting time of the grouting material prepared by the present invention may be controlled by the adding amount of the catalyzer and may be effectively regulated according to the demands of the engineering, and thus it is guaranteed that the grout is good in operability and engineering applicability. Full composition of multi-component materials is achieved, a purpose of a super-superposition effect of all components is achieved, and an effect of effective blocking of water inrush in the water-rich karst area is achieved. Moreover, the grouting material has the technical advantages of being convenient to operate and more efficient.

The above descriptions are merely preferred examples of this application and are not intended to limit this application. For those skilled in the art, this application may have various modifications and changes. Any modification, equivalent replacement, or improvement made without departing from the spirit and principle of this application shall fall within the protection scope of this application.

What is claimed is:

1. A preparation method of a karst channel type water inrush efficient-blocking ultra-high expansion grouting material, the method comprising:
   (1) adding a cross-linking agent into an acrylic acid solution, and then adding an active substance containing a hydrophilic group for polymerization reaction to obtain a precursor;
   (2) adding an initiator into the precursor obtained in step (1), heating for reaction to obtain a polymer solution, and smashing and drying the polymer solution to obtain primary water-absorbent resin particles; and
   (3) with the primary water-absorbent polymer resin particles as an inner core, uniformly spraying a gelling agent onto the primary water-absorbent resin particles, wherein part of the gelling agent penetrates into the inner core of primary water-absorbent polymer resin particles, followed by drying, to thereby form a shell structure comprised of the gelling agent attached to a surface of the primary water-absorbent polymer resin particles and creating polymer particles A of an inlaid type core-shell structure; and
   (4) providing a cross-linking solidifying fluid B with the polymer particles A; wherein
   the gelling agent is used to catalyze the cross-linking solidifying fluid B, the cross-linking forming a gel;
   the gelling agent is a composition of polyethylene glycol, 4,4'-methylene bis(o-chloroaniline) and polyether polyol; and
   the cross-linking solidifying fluid B is a substance capable of reacting with water.

2. The preparation method according to claim 1, wherein in step (1), one or more of the following conditions is satisfied:
   (a) a concentration of monomer in the acrylic acid solution is 10% to 80%;
   (b) the active substance containing the hydrophilic group comprises any one or a mixture of starch, polyvinyl alcohol, polyacrylamide, and acrylamide, or any one or a mixture of solutions of the above substances;
   (c) the cross-linking agent comprises any one or a composition of several of N,N-methylene bisacrylamide, divinyl benzene, isocyanate, dipentaerythritol hexaacrylate and pentaerythrityl tetraethylhexanoate; and
   (d) an adding ratio of the cross-linking agent is 0.3% to 2% of the mass of the acrylic acid in step (1).

3. The preparation method according to claim 1, wherein the gelling agent comprises an aqueous solution and the gelling agent is prepared into the aqueous solution with a mass fraction of 50% to 90%.

4. The preparation method according to claim 1, wherein a preparation method of the cross-linking solidifying fluid B comprises:
   S1, dehydrating polyether polyol: uniformly mixing metered polyether polyol and a plasticizer, then performing dehydration under a vacuum heating condition, cooling after dehydration is completed to obtain dehydrated polyether polyol and then putting the dehydrated polyether polyol in a dry container and sealing for standby application;
   S2, synthesizing a prepolymer: dropwise adding polyisocyanate into the dehydrated polyether polyol under a heating condition, then heating for polymerization reaction, after reaching a reaction endpoint, cooling and discharging, and storing an obtained prepolymer in an airtight and dry container; and
   S3, adding a diluent into the prepolymer, and uniformly stirring to obtain the cross-linking solidifying fluid B.

5. The preparation method according to claim 4, wherein in S1, one or more of the following conditions is satisfied:
   (a) the vacuum heating condition comprises performing dehydration for 2.5 h to 4 h at 110° C. to 120° C. with a vacuum degree of −0.080 MPa to 0.1 MPa, and after the dehydration is completed, cooling to reach 50° C. or below;
   (b) the plasticizer comprises any one or a mixture of phthalate ester, terephthalate, and isophthalate; and
   (c) an adding mass ratio of the polyether polyol to the plasticizer is (2.94-5.88):(1-2.05).

6. The preparation method according to claim 4, wherein an adding amount of the diluent is 15% to 35% of mass of the prepolymer.

7. The preparation method according to claim 4, wherein the adding amount of the diluent is 25% to 35% of mass of the prepolymer.

8. The preparation method according to claim 1, wherein step (1) further comprises a neutralization step wherein the acrylic acid is partially neutralized with an alkaline liquor to obtain a partially-neutralized solution containing the acrylic acid, wherein the partially-neutralized solution is mixed with the cross-linking agent, and then subjected to the polymerization reaction with the active substance containing a hydrophilic group to obtain the precursor.

9. The preparation method according to claim 8, wherein in the neutralization step, one or more of the following conditions is satisfied:
   (a) the neutralization degree of the acrylic acid is 60% to 90%;
   (b) the alkaline liquor comprises any one or a mixture of several of sodium hydroxide, calcium hydroxide and potassium hydroxide; and
   (c) the alkaline liquor is slowly added into the acrylic acid solution in an ice-water bath for neutralization.

10. An ultra-high expansion grouting material prepared by the method according to claim 1, wherein the grouting material comprises a mixture of the polymer particles A and the cross-linking solidifying fluid B.

11. The ultra-high expansion grouting material according to claim 10, wherein a mass ratio of the polymer particles A to the cross-linking solidifying fluid B is (1-3):(1-5).

12. The ultra-high expansion grouting material according to claim 11, wherein the retarder is tartaric acid or citric acid.

13. The ultra-high expansion grouting material according to claim 10, wherein a use amount of the retarder is controlled to be 8% to 12%.

14. The preparation method according to claim 1, wherein in step (2), one or more of the following conditions is satisfied:
   (a) the initiator is an inorganic peroxide initiator;
   (b) an amount of the initiator is 0.1% to 0.7% of the mass of the acrylic acid in step (1);
   (c) the drying comprises aeration-drying at 100° C. to 200° C. for 20 min to 120 min; and
   (d) a temperature of the polymerization reaction is 65° C. to 90° C., and a reaction time is 23 min to 119 min.

15. The preparation method according to claim 1, wherein in step (3), one or more of the following conditions is satisfied:
   (a) an amount of a gelling agent solution accounts for 1% to 10% of the total mass of the particles;
   (b) a mass ratio of polyethylene glycol to 4,4'-methylene bis(o-chloroaniline) to polyether polyol in the gelling agent is (1-5):(1-5):(2-5); and
   (c) the gelling agent comprises an aqueous solution.

16. The preparation method according to claim 4, wherein in S2, one or more of the following conditions is satisfied:
   (a) the isocyanate is toluene diisocyanate, polymethylene polyphenyl polyisocyanate, methylene diphenyl diisocyanate or combination thereof;
   (b) the heating condition comprises heating to no more than 50° C., controlling a temperature to be constant, completing dropwise adding within 30 min, and after dropwise adding is completed, uniformly stirring; and
   (c) a temperature for heating for the polymerization reaction is 80° C. to 85° C.

17. The preparation method according to claim 4, wherein in S3, the diluent is acetone.

18. The ultra-high expansion grouting material according to claim 10, wherein the cross-linking solidifying fluid B further comprises a catalyzer or a retarder to control a solidifying rate of the cross-linking solidifying fluid B,
   wherein the catalyzer is formed by compounding of meta-toluenediamine, triethylenediamine and dibutyltin dilaurate, and an adding amount of the catalyzer is 2%-5% of mass of the cross-linking solidifying fluid B, and
   wherein the retarder is an organic weak acid type compound.

* * * * *